Figure 1:
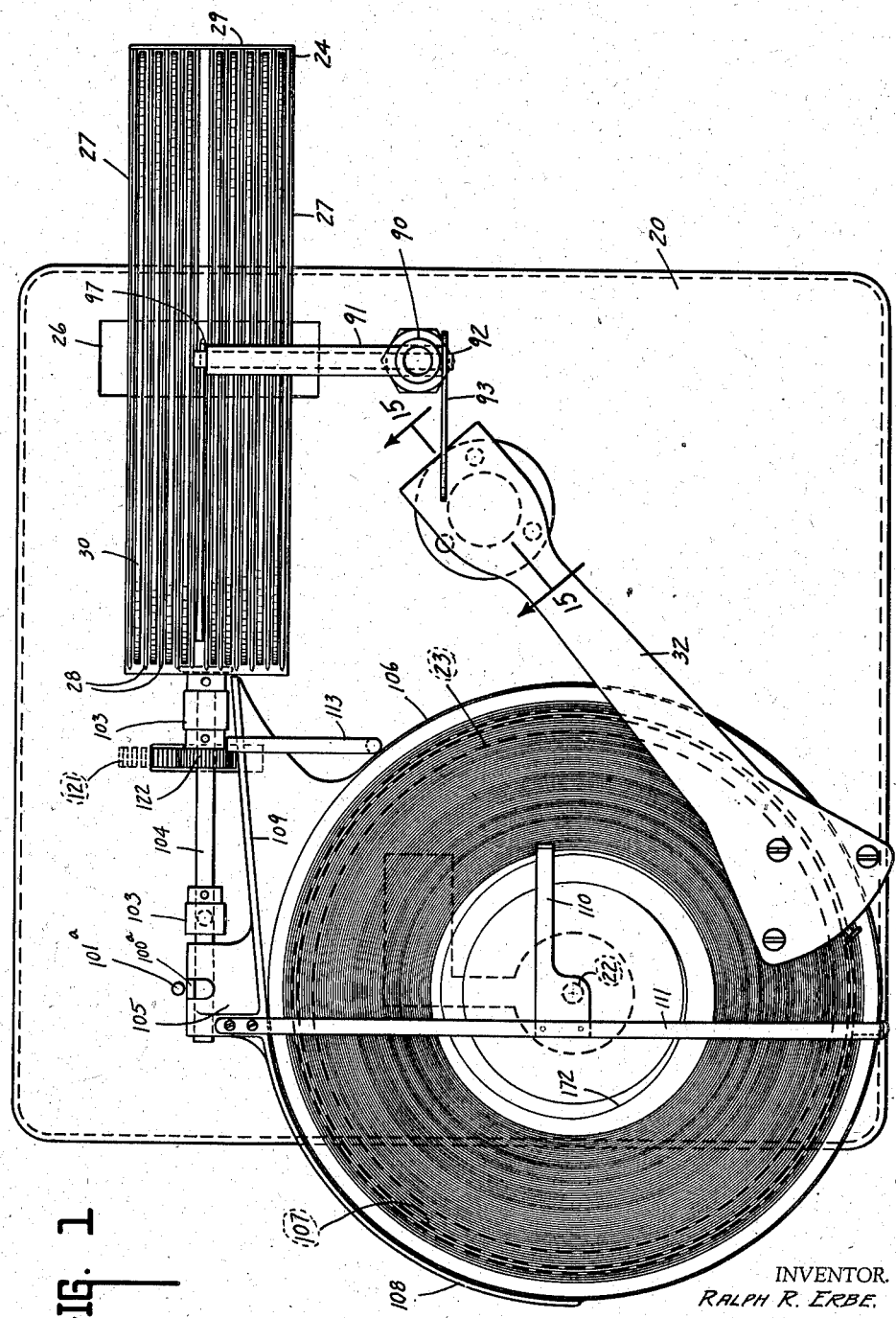

Nov. 22, 1938.                 R. R. ERBE                 2,137,276
                         AUTOMATIC PHONOGRAPH
                        Filed March 11, 1935        6 Sheets-Sheet 1

INVENTOR.
RALPH R. ERBE.
BY Lockwood Goldsmith + Galt
ATTORNEYS.

Nov. 22, 1938.   R. R. ERBE   2,137,276
AUTOMATIC PHONOGRAPH
Filed March 11, 1935   6 Sheets-Sheet 2
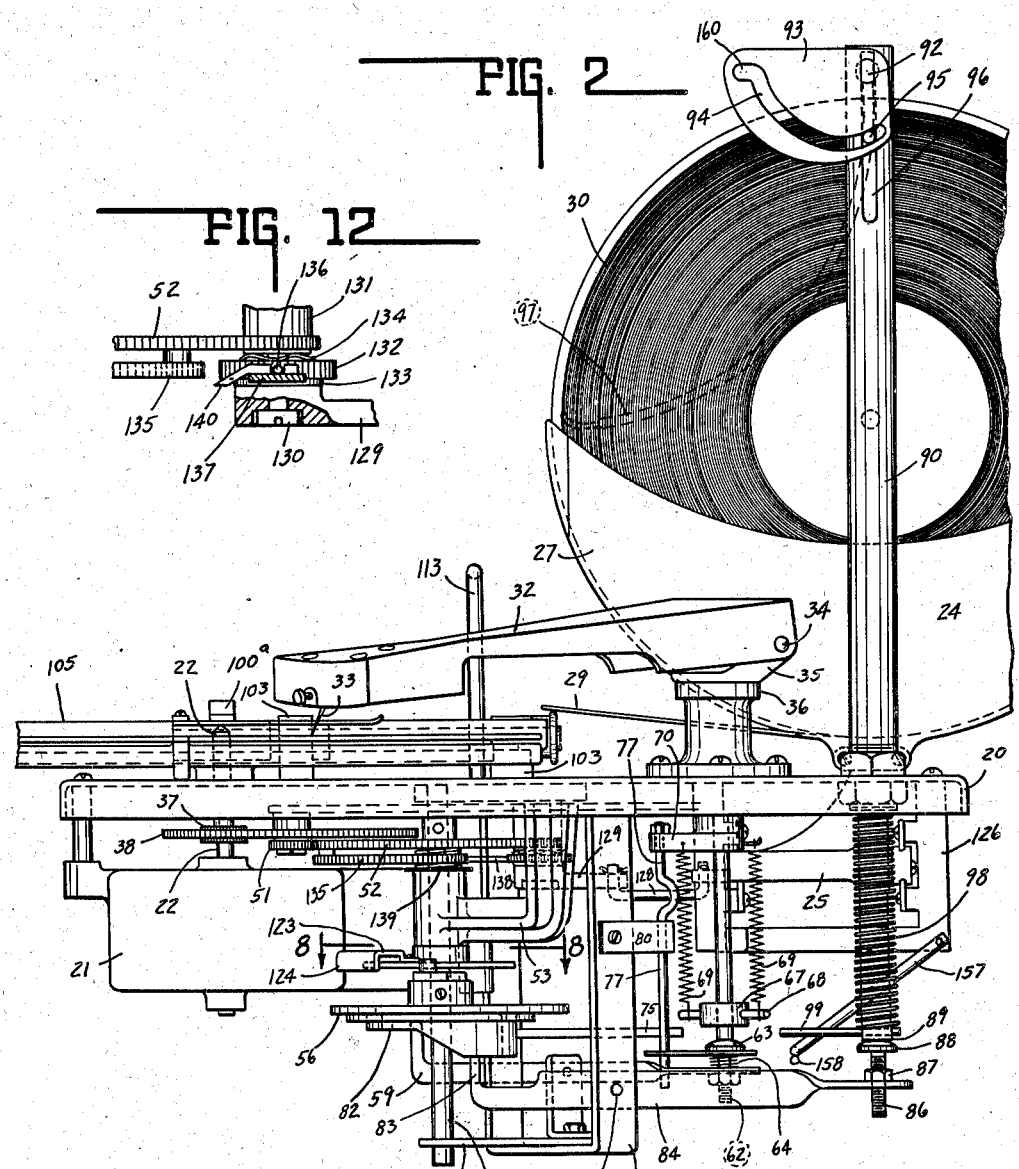
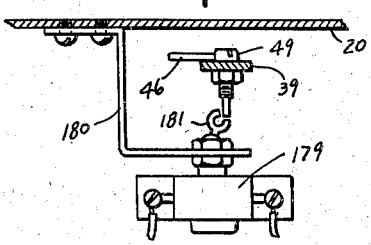
INVENTOR.
RALPH R. ERBE.
BY Lockwood Goldsmith & Galt
ATTORNEYS.

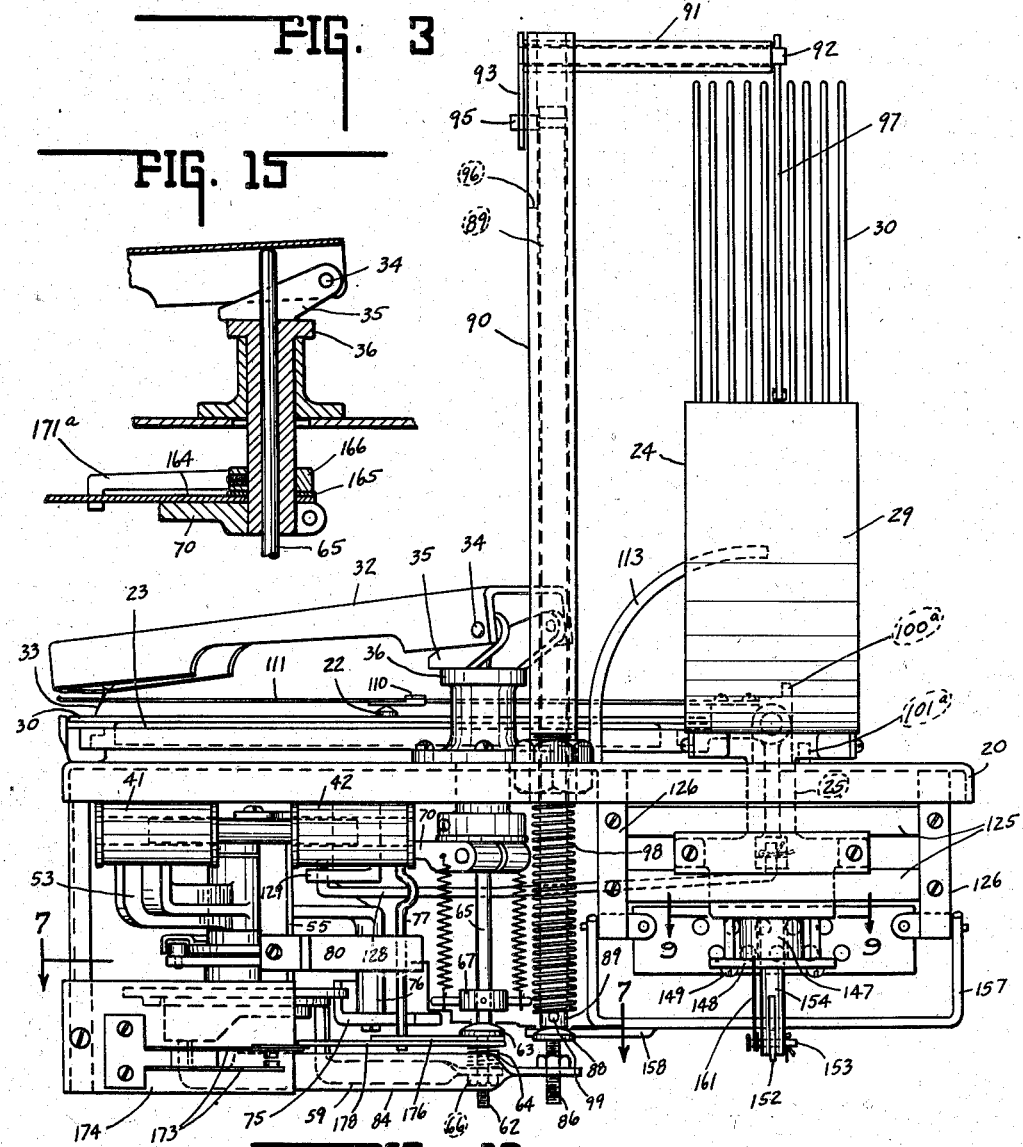

Nov. 22, 1938.  R. R. ERBE  2,137,276
AUTOMATIC PHONOGRAPH
Filed March 11, 1935  6 Sheets-Sheet 4
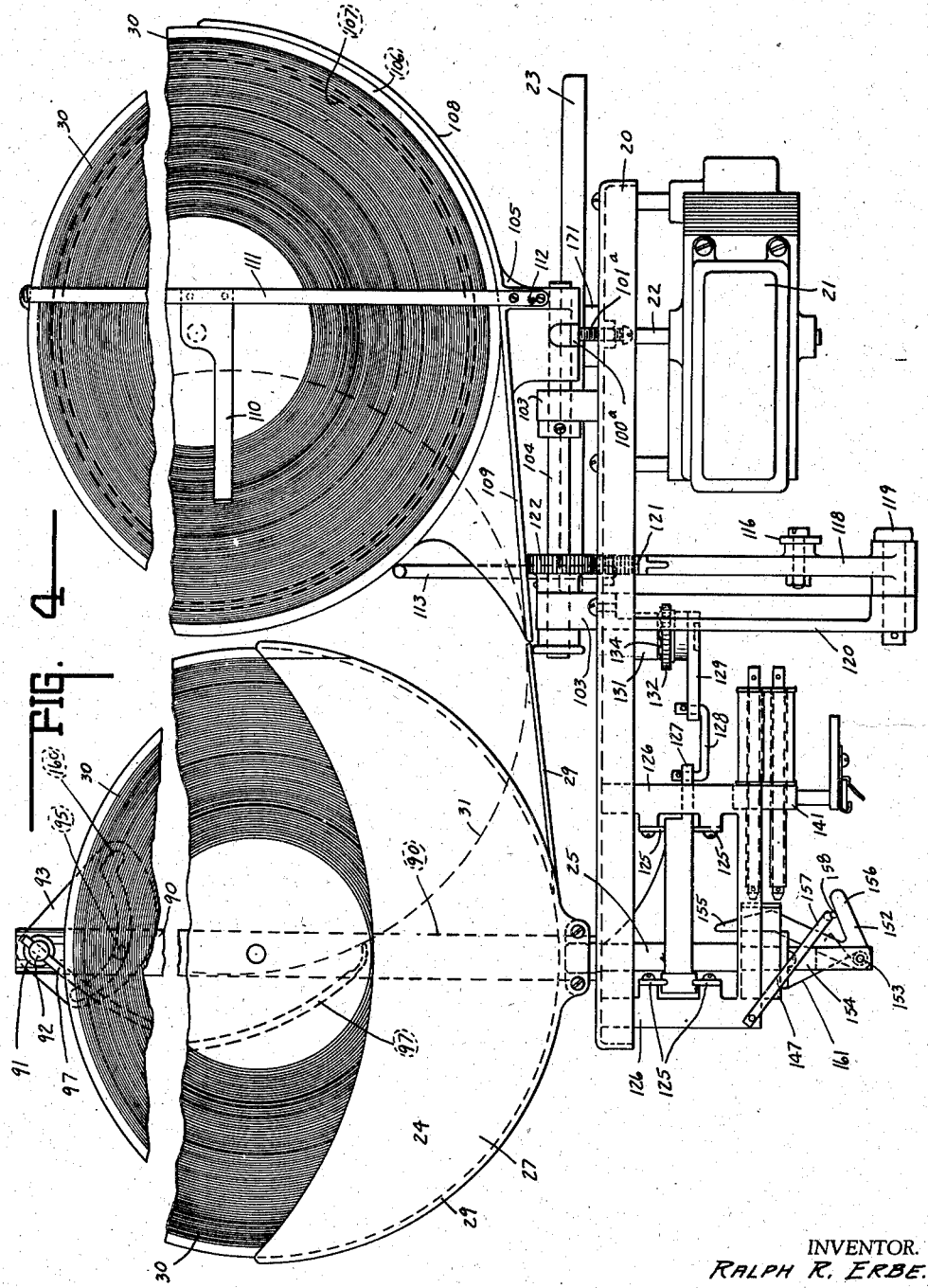
INVENTOR.
RALPH R. ERBE.
BY Lockwood Goldsmith & Galt
ATTORNEYS.

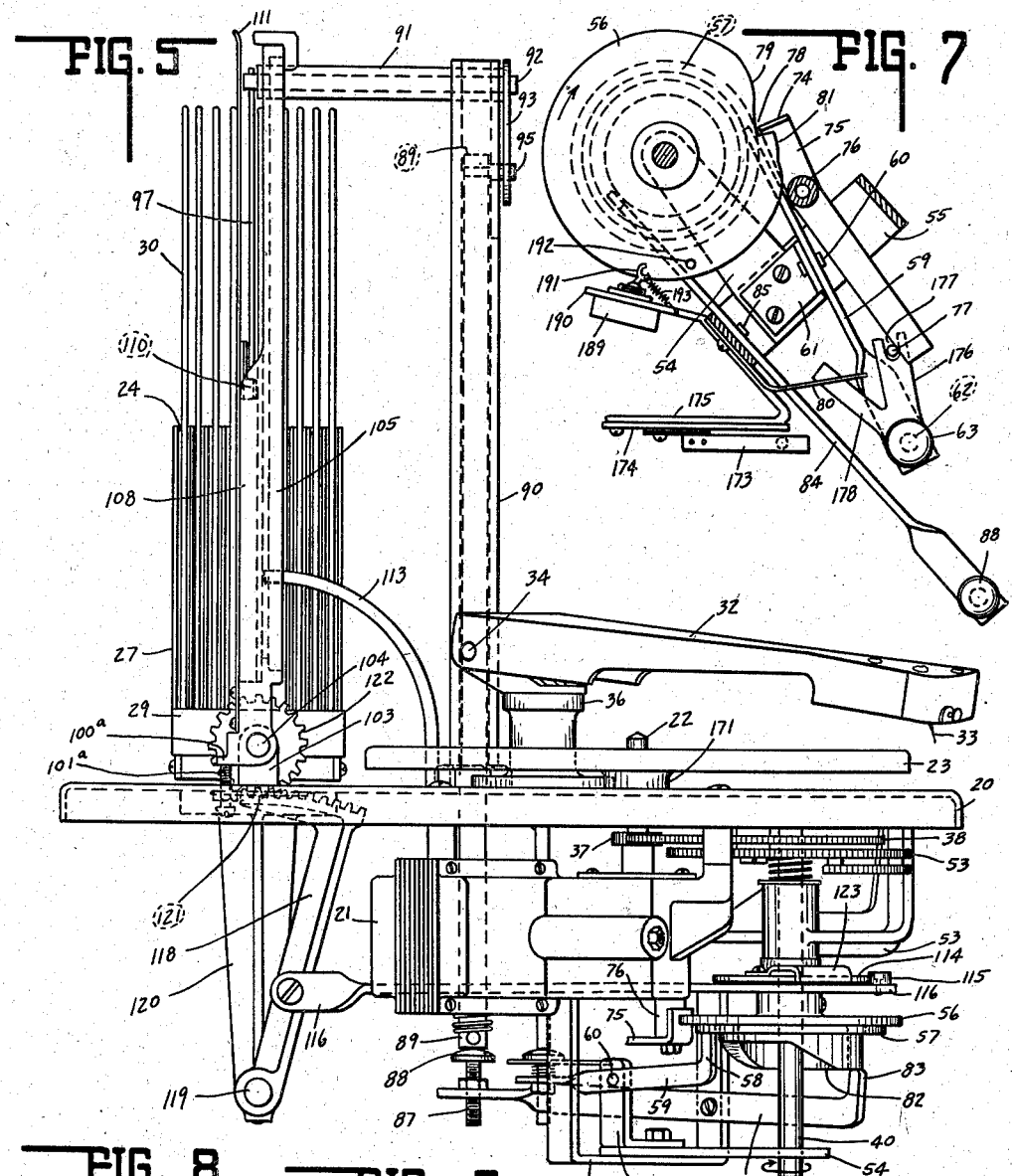
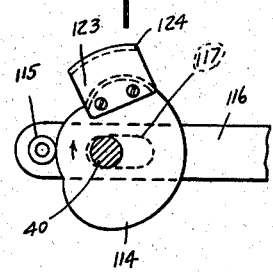
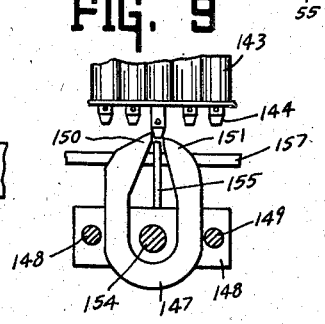

Nov. 22, 1938.  R. R. ERBE  2,137,276
AUTOMATIC PHONOGRAPH
Filed March 11, 1935  6 Sheets-Sheet 6

INVENTOR.
RALPH R. ERBE.
BY Lockwood Goldsmith & Galt
ATTORNEYS.

Patented Nov. 22, 1938

2,137,276

UNITED STATES PATENT OFFICE 2,137,276

AUTOMATIC PHONOGRAPH

Ralph R. Erbe, Fort Wayne, Ind., assignor, by mesne assignments, to Reconstruction Finance Corporation, Chicago, Ill., a corporation Application March 11, 1935, Serial No. 10,441

8 Claims. (Cl. 274—10)

This invention relates to an automatic record changing phonograph of the type having a magazine for storing a number of records together with mechanism for automatically withdrawing a record from the magazine for reproduction and then returning the record to the magazine when played.

The principal object of the invention is generally to improve upon and simplify the operation of this type of phonograph and to this end the invention consists in the various features hereinafter described and defined in the appended claims.

In the drawings, which illustrate the invention in a preferred form, there is shown a phonograph of the selective type wherein any desired record may be pre-selected for withdrawal from the magazine for playing. It is also possible to pre-select a number of records to be played in sequence. The magazine is placed in an easily accessible position above the deck plate of the machine and the records are stored on edge so they may be easily removed and replaced by hand when it is desired to change the program.

Figure 6:
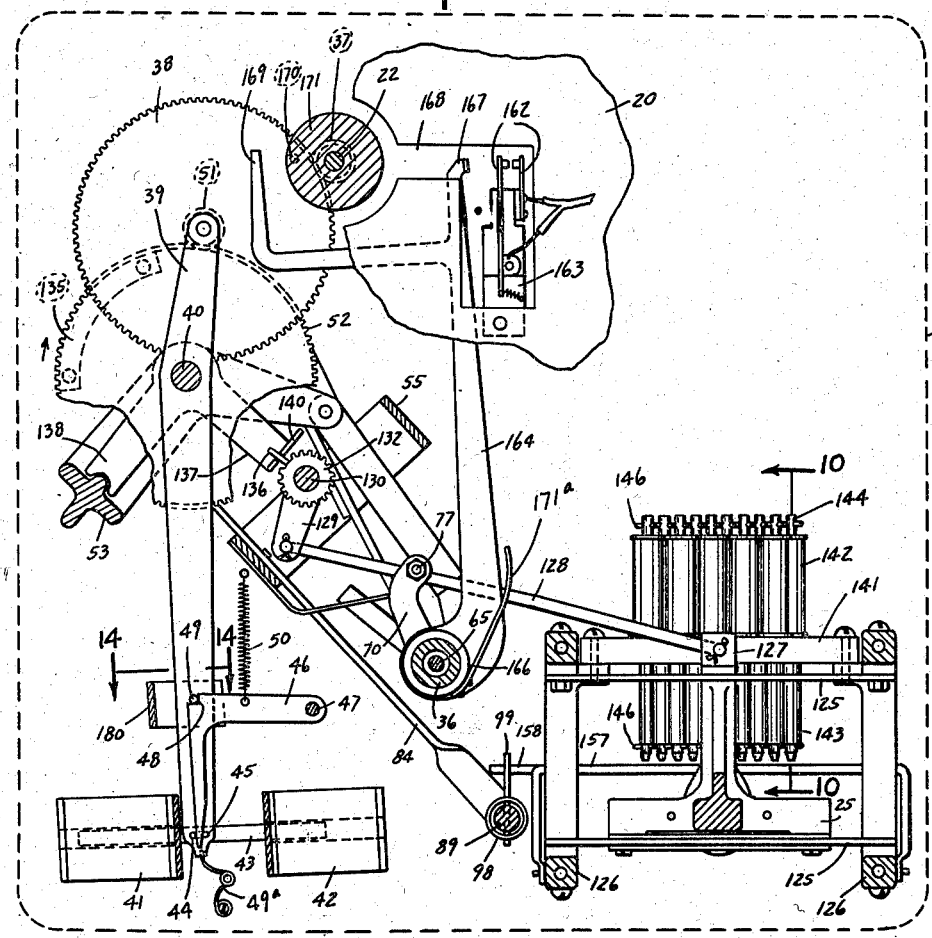
Figure 13:
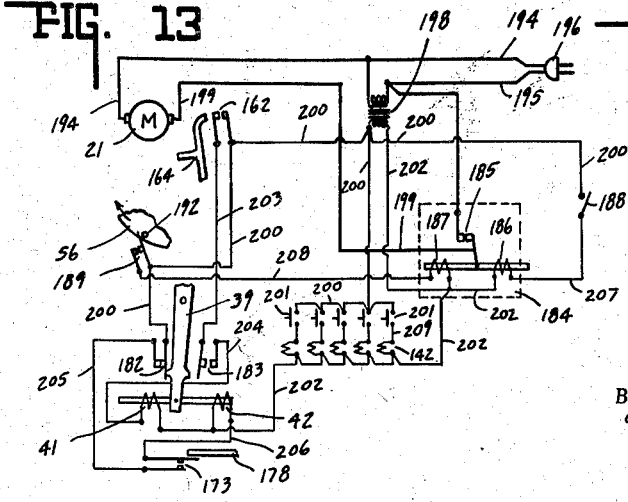
Figure 11:
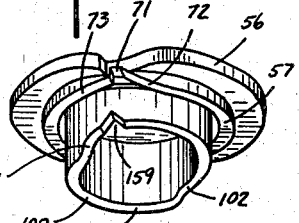

The full nature of the invention will be understood from the accompanying drawings and the following description and claims:

Fig. 1 is a plan view showing the relative positions of the playing turntable, storage magazine and pickup arm. Fig. 2 is an elevational view of the front of the machine referring to Fig. 1. Fig. 3 is an elevational view of the right side of the machine referring to Fig. 1. Fig. 4 is an elevational view of the rear of the machine with a record in process of transfer to or from the turntable. Fig. 5 is an elevational view of the left side of the machine with the parts in the same position as Fig. 4. Fig. 6 is a plan view partly in section and with parts removed to show other parts in detail. Fig. 7 is a sectional view of a part of the apparatus taken substantially on the line 7—7 of Fig. 3. Fig. 8 is a fragmentary sectional view taken on the line 8—8 of Fig. 2. Fig. 9 is a fragmentary sectional view taken on the line 9—9 of Fig. 3. Fig. 10 is a fragmentary sectional view taken on the line 10—10 of Fig. 6. Fig. 11 is a perspective view of a master cam used for controlling certain automatic movements of the machine. Fig. 12 is an elevational view with parts cut away showing a portion of the drive mechanism for the selection of records from the magazine. Fig. 13 is a diagram of electrical connections. Fig. 14 is a sectional view taken on the line 14—14 of Fig. 6. Fig. 15 is a sectional view taken on the line 15—15 of Fig. 1.

The movable mechanism of the machine is mounted upon a stationary deck plate 20 which may be suitably supported in any manner within a cabinet which is not shown in the drawings. Beneath the said deck plate there is mounted the usual electric motor 21 which rotates a vertical stem 22 extending upwardly through the deck plate 20. The usual rotatable turntable 23 is carried upon said stem and is rotated thereby, the upper end of said stem forming a centering pin for centering records upon the turntable.

A record storage magazine 24 is mounted upon the upper end of a member 25 which is slidably supported beneath the deck plate 20 and extends upwardly through an opening 26 therein. The magazine is provided with side plates 27, partition plates 28 and a bottom plate 29. The bottom plate 29, referring particularly to Fig. 4, extends about the lower surface of the left-hand portion of the side plates 24, but, at the right of the magazine, it leaves the side plates and extends outwardly and upwardly at a slight angle. It will be apparent that the magazine is adapted to hold a record 30 on edge in each of the compartments formed by the partitions 28 and that the records will normally rest in the magazine because of the upward inclination of the bottom plate 29. However, a record may be removed from the magazine by rolling the same to the right along the bottom plate, as illustrated by the broken line 31 in Fig. 4.

The machine is provided with the usual pickup arm 32 carrying a stylus 33 which engages a record upon the turntable for reproducing the same. The stylus is associated with the usual pickup mechanism carried by the pickup arm 32 and not shown in the drawings. The said pickup mechanism may be connected to any suitable form of amplifier and reproducer. The pickup arm is pivotally mounted at 34 upon lugs 35 carried upon the upper end of a rotatable bushing 36. The arm may thus be raised by movement about its pivot 34 to remove the stylus from the record and may be oscillated by movement of the bushing 36 to permit the stylus to follow the record groove and to permit the return of the same to the starting position.

In the automatic operation of the phonograph, when a record has been completely reproduced, the pickup arm is raised and moved counterclockwise to clear the record, the record is removed from the turntable and placed in its proper compartment in the magazine, a new record is removed from the magazine and placed on the turntable, the pickup arm is moved to a position above the starting point of the new record and the stylus is lowered into playing position thereon. The mechanism by which these automatic movements are produced will now be described in detail.

*Power drive for automatic mechanisms*

The stem 22 which is continuously driven by the motor 21 carries a pinion 37 which is adapted to mesh with a gear 38 rotatably mounted upon one end of a clutch lever 39 (Fig. 6). The clutch lever 39 is freely mounted upon a vertical shaft 40 and extends to a position between a pair of solenoids 41 and 42. Said solenoids are suitably supported beneath the deck plate 20 and are shown in Figs. 6 and 3 but omitted from Fig. 2 for the purpose of showing other parts. Said solenoids have a common armature 43 carrying a pin 44 engaging a slotted opening 45 in the end of the clutch lever 39. It will be apparent that when the solenoid 41 is energized it will move the armature 43 and clutch lever 39 to bring the gear 38 into mesh with the pinion 37. The lever 39 is locked in this position by a locking lever 46 pivotally mounted at 47 on the undersurface of the deck plate 20. Said locking lever is provided with a notch 48 engaging a pin 49 carried by the clutch lever 39 and is urged into locking position by a tension spring 50. In the locked position shown in Fig. 6, the locking lever prevents accidental movement of the clutch lever to disengage the gear 38 from the pinion 37, even though solenoid 41 is deenergized. An overcenter spring 49a has one end anchored to the deck plate 20 and the opposite end engaging a suitable recess in the end of the lever 39 and aids in retaining the lever 39 at either of its extreme positions.

When the solenoid 41 has been deenergized and solenoid 42 energized, the armature 43 is drawn to the right, pressing the pin 44 against the tip of the locking lever 46 and thus moving the locking lever from locking position. When the notch 48 in said lever has cleared the pin 49, the pin 44 reaches the end of the slotted opening 45 and the further movement of the armature 43 moves the clutch lever 39 to disengage the gear 38 from the pinion 37. All of the automatic movements of the machine are driven through the gear 38 and thus the actuation of solenoid 41 initiates the automatic movements and the actuation of solenoid 42 stops the same.

A pinion 51 is also carried by the clutch lever 39 and is formed integrally with the gear 38. The pinion 51 meshes with a gear 52 which is secured to the shaft 40 and is, therefore, always in mesh with pinion 51 irrespective of the position of the clutch lever 39. The shaft 40 is carried by a bearing bracket 53 secured to the undersurface of the deck plate 20 and finds a lower bearing in a member 54 which is secured to the lower end of a U-shaped bracket 55, also supported on the lower surface of the deck plate. The shaft 40 is rotated as long as the pinion 37 and gear 38 are in mesh. The automatic movements are so timed that one complete revolution of shaft 40 completes a cycle of operation and returns the parts to initial position.

*Tone arm elevating and lowering mechanism*

The shaft 40 has secured thereto a master cam 56 shown in detail in Fig. 11. Said cam is provided on its lower face with a cam track 57 which is engaged by the upturned end 58 of a lever 59 (Figs. 5 and 7). Said lever finds a pivot 60 in an angle bracket 61 mounted upon the bracket 55. The opposite end of the lever has freely mounted therein a vertical stud 62 having a head 63 formed thereon. A spring 64 normally urges said stud upwardly against the lower end of a vertical pin 65 which extends upwardly through the bushing 36 and engages the pickup arm. A lock nut 66 upon the stud 62 limits the upward movement thereof. The pin 65 carries a collar 67 to which there are attached, by means of pins 68, a pair of tension springs 69. Said springs are attached at their upper ends to an arm 70 secured to the bushing 36 and thus serve to counterbalance a portion of the weight of the pickup arm and the associated mechanism.

In the normal or playing position of the mechanism the end of the lever 59 engages a notch 71 in the cam track 57. The opposite end is, therefore, at its lowermost position and permits the stylus to engage the record. As soon as the rotation of the master cam 56 is commenced, the end of the lever 59 is pressed downwardly by a sloping portion 72 of the cam track 57 and the pin 65 and pickup arm are elevated to raise the stylus from the record. The cam track 57 is shaped to maintain the stylus in its elevated position until the master cam has made a nearly complete revolution, whereupon the end of the lever 59 engages a second inclined portion 73 on said cam track which permits the stylus to be lowered into engagement with the new record. At the end of a complete revolution of the master cam 56 the lever again enters the notch 71 and the opposite end thereof is lowered sufficiently to completely withdraw the pressure of the spring 64 from the lower end of the stem 65. It will be apparent that the spring 64 provides a cushioning effect in the motion of the pickup arm which prevents damage to the mechanism and excessive noise.

*Mechanism for horizontal movement of the pickup arm*

The outer edge of the master cam 56 is formed as a cam track which is engaged by an upturned end 74 of a lever 75, as best seen in Fig. 7. The lever 75 is pivotally mounted upon a bearing 76 formed integrally with the bracket 53. The opposite end of the lever engages a vertical pin 77 which is rigidly secured to the arm 70 which is in turn clamped to the lower end of the bushing 36. In the normal or playing position of the mechanism, the end of the lever 75 rests in a notch 78 in the edge of the master cam 56. When the rotation of the master cam has been started by engagement of the clutch gear 38 with the pinion 37 and has progressed sufficiently to remove the stylus from the record, the end of the lever 75 engages an inclined portion 79 of the master cam and is rocked thereby in a clockwise direction, referring to Fig. 7. In this movement the lever engages the pin 77 and rocks the same in the counterclockwise direction carrying with it the bushing 36 and the pickup arm 32. The shape of the master cam is such that the pickup arm is moved entirely clear of the record, as shown in Fig. 5.

During the latter portion of this movement, the pin 77 engages a leaf spring 80 mounted upon the bracket 55. As the master cam 56 approaches the end of a complete revolution, the lever 75 is brought into engagement with a portion 81 thereof which is somewhat reduced in diameter and permits the leaf spring 80 to move the pin 77 sufficiently to bring the stylus over the starting point of a new record which has meanwhile been placed upon the turntable. While the pickup arm is held in this position, the stylus is lowered onto the record as previously described. When a single revolution of the master cam is complete, the notch 78 therein is again opposite the end of the lever 75 which is slowly moved into the notch by the movement of the stylus in following the record groove inwardly upon the record.

*Mechanism for moving the record from the magazine*

The master cam 56 is provided on its undersurface with a cam track 82 which is engaged by the upturned end 83 of a lever 84 pivotally mounted at 85 on the bracket 55. The opposite end of the lever has secured thereto a stud 86 by means of a lock nut 87, said stud having a head 88 engaging the lower end of a vertical rod 89. The rod 89 extends upwardly through a tube 90 mounted upon the deck plate 20. The tube 90 has secured to its upper end a second tube 91 extending horizontally over the magazine. The tube 91 carries a stem 92 rotatable therein. The stem 92 carries at one end a cam plate 93, best seen in Fig. 2. The plate 93 has an irregularly shaped slotted opening or guideway 94 which engages a pin 95 extending through a slotted opening 96 in the tube 90 and secured to the upper end of the rod 89. A finger 97 is secured to the opposite end of the stem 92 and is adapted to move over the magazine to push a record therefrom as the stem 92 is oscillated within the tube 91. The rod 89 is normally maintained in contact with the head 88 by means of a compression spring 98 abutting against a pin 99 carried at the lower end of said rod and against the undersurface of the deck plate 20.

In the normal or playing position of the mechanism, the end of the lever 84 rides upon the lowermost portion 100 of the cam track 82. The rod 89 is, therefore, pushed upwardly against the action of the spring 98 into the position shown in Fig. 2. In this position the pin 95 in the guideway 94 operates to maintain the cam plate 93 in the proper position to hold the arm 97 between the records of the magazine as shown in said figure and in Fig. 1. It will be seen that the finger 97 occupies the space from which a record has previously been removed for playing. During the rotation of the master cam 56 the lever 84 is engaged by an upwardly inclined portion 101 of the cam track which permits the rod 89 to be forced downwardly by the spring 98. The downward movement of the pin 95 acting in the guideway 94 oscillates the plate 93 and the finger 97 counter-clockwise (Fig. 2). At this time the record which has been played is being rolled back into the magazine, as will be hereinafter described and said record is gently guided into its proper place by engagement with the finger 97. The cam track 82 is so shaped that the finger 97 is moved clear of the magazine when the record has finally been placed therein. The magazine is then moved by mechanism to be hereinafter described to bring another record opposite said finger and thereafter the lever 84 is engaged by the downwardly inclined portion 102 of the cam track 82. The consequent movement of the lever 84 again pushes the rod 89 upwardly, causing the plate 93 and finger 97 to be rocked in the proper direction to roll the new record from the magazine along the bottom plate 29 thereof, as illustrated in Fig. 4.

*Record transfer mechanism*

Mounted upon the top of the deck plate 20 are a pair of bearings 103 supporting a rock shaft 104. The rock shaft 104 carries a transfer cradle 105 secured thereto. Said cradle consists of a ring or annulus 106 having an outside diameter approximately that of the records 30 and having its inside diameter, represented by the broken line 107 in Figs. 1 and 4, sufficiently large so that the turntable 23 may pass within the ring as the latter is rocked downwardly by movement of the shaft 104. The cradle is provided with a rim 108 about a portion thereof, best seen in Fig. 4, and with a trackway 109 upon which the records may roll in entering and leaving the cradle.

The position of the cradle for receiving a record from the magazine and for returning the same thereto is shown in Fig. 4. In this position the trackway 109 forms a continuation of the bottom plate 29 of the magazine and the record is rolled by the finger 97 along said trackway until it comes to rest against the rim 108. The record in this movement is guided into position against the ring 106 by means of a resilient finger 110 secured to a resilient arm 111, which is secured at one end 112 to the frame of the cradle.

While the record is held in place by the finger 97, the shaft 104 is oscillated by means hereinafter described to lower the cradle into the position shown in Fig. 1. In this movement the record is prevented from rolling from the cradle by means of a curved rod 113 secured to the deck plate 20 or other suitable means. The downward movement of the cradle places the record upon the turntable with its centering hole engaging the centering pin 22 of the table. In this movement the ring 106 passes below the level of the table leaving the record resting thereon in the normal manner. At the same time, the centering pin 22 engages the base of the finger 110, as best seen in Figs. 1 and 3. The finger is upwardly pressed to disengage it from the record and thus prevent frictional engagement with the record during playing.

When the playing of the record has been completed, the shaft 104 is again oscillated to raise the cradle, thus removing the record from the turntable. Upon reaching the upright position, the cradle is stopped by a lug 100a engaging an adjustable stop pin 101a secured to the deck plate 20. In this position the record rests against the finger 97 and the retraction of said finger, as previously described, permits the record to roll back into its place in the magazine.

The oscillation of the shaft 104 is controlled by a cam 114 carried upon the shaft 40. Said cam engages a roller 115 carried upon a link 116 which has a slotted opening 117 engaging the shaft 40. The opposite end of the link 116 is pivotally connected to a quadrant arm 118 which is in turn pivotally mounted by a pin 119 upon a bracket 120 secured to the underside of the deck plate 20. The quadrant arm 118 carries a gear quadrant 121 at its upper end, the teeth of which mesh with a gear 122 carried upon the shaft 104. The cam 114 is so shaped that it forces the roller 115 and link 116 to the right in Fig. 5 at the proper time to raise the cradle 105. The cam carries a guide element 123 which has a downwardly extending lip 124 positioned to engage the outer edge of the roller and force the same

Selective mechanism

For selecting the record or records to be played, the magazine is horizontally moved to bring the desired record opposite the finger 97. For this purpose the member 25 which carries the magazine is slidably mounted upon guide bars 125 carried upon hangers 126 secured to the undersurface of the deck plate 20. The member 25 is provided with a tongue 127 to which there is pivotally connected a link 128, the opposite end of which is pivotally secured to an arm 129 freely mounted upon a pin 130, said pin being in turn secured to a boss 131 on the undersurface of the deck plate 20 (see Fig. 12). A pinion 132 is likewise freely mounted upon the pin 130 and a friction washer 133 of cork or other suitable material is interposed between the pinion 132 and the arm 129. A spring washer 134 surrounds the pin 130 above the pinion 132. Said washer abuts against the boss 131 and presses the pinion downwardly against the cork washer 133. There is thus produced a frictional engagement by means of which the arm 129 is rotated by rotation of the pinion 132 unless the movement of said arm is positively stopped by external means, whereupon the movement of the pinion 132 continues independently of the arm 129. The pinion 132 meshes with a gear segment 135 carried upon the underside of the gear 52 and said segment has the proper number of teeth to rotate the pinion through one revolution for each revolution of the gear 52.

The pinion 132 has mounted thereon a pin 136 which is adapted to engage a notch in the end of an L-shaped member 137 (Figs. 6 and 12). The member 137 is freely mounted on the shaft 40 and has its opposite end 138 engaging the bracket 53 to prevent rotation about the shaft 40. A spring 139 surrounds the shaft 40 beneath the member 137 and normally maintains the same in an upraised position against the hub of the gear 52. In this position, it engages the pin 136 and prevents rotation of the pinion 132. The member 137 is formed with an inclined finger 140 projecting into the path of travel of the segment 135. When engaged by said segment the member 137 is forced downwardly freeing the pin 136 from its notch and permitting the pinion 132 to rotate. When the gear segment 135 has passed and the pinion has made a complete revolution, the spring 139 again forces the member 137 upwardly to lock the pinion 132 in place.

The hangers 126 carry a cross piece 141 on which there are mounted solenoids 142, best seen in Fig. 6. Said solenoids are equal in number to the number of records in the magazine and the horizontal spacing of their center lines is equal to the spacing of the records in the magazine. Each of the solenoids 142 is provided with an internal shell 143 projecting through the cross member 141 and each has an armature 144 slidably mounted within said shell. As best seen in Fig. 10, the armatures 144 are formed with a central portion 145 of reduced diameter. Therefore, when the solenoids 142 are energized, the armatures tend to move to the left in Fig. 10. The travel of said armatures is limited by pins 146 abutting against the ends of the shell 143.

A permanent magnet 147 of the usual horseshoe form is clamped to the undersurface of the member 25 by means of a bar 148 and screws 149. The tips of said magnet are formed as best shown in Fig. 9, the left-hand tip 150 projecting farther forward than the right-hand tip 151. The magnet is so positioned that each of the armatures 144, when moved by the energizing of its corresponding magnet, projects into the path of travel of the left-hand tip 150 of the magnet.

A double arm lever 152 is pivotally mounted at 153 upon a member 154 extending downwardly from the member 25 (Fig. 4). The lever 152 has one arm 155 extending upwardly between the legs of the magnet 147 and has its second arm 156 extending into the path of movement of a yoke 157 which is pivotally mounted upon the hangers 126. Said yoke has an extension 158 projecting into the path of travel of the pin 99 (Fig. 6).

In the operation of this portion of the mechanism a magnet 142 corresponding to any desired record is momentarily energized by suitable means, causing the corresponding armature 144 to be moved into the path of travel of the tip 150 of the magnet. This may be done at any time during the playing of a record or during the return of a record to the magazine, or during the removal of a record therefrom. At the next succeeding operation of the phonograph after the record just played has been returned to the magazine, the gear segment 135 engages the pinion 132 and rotates the same through one revolution in the counterclockwise direction. The rotation of the pinion 132 causes a corresponding rotation of the arm 129. If none of the solenoids 142 had been energized the arm 129 would make a complete revolution moving the magazine first to the right to its extreme position, then to the left to an extreme position and then again to the right to its starting position and the same record will be removed and replayed.

If, however, one of the armatures 144 to the right of the played record (Fig. 6) has been moved into the path of the magnet tip 150, the magazine will be mechanically stopped when said tip engages said armature. When so stopped, the magazine is positioned with the record corresponding to the energized solenoid opposite the finger 97 and in position to be removed by said finger. Further movement of the arm 129 is, of course, impossible but the friction drive connection between said arm and the pinion 132 permits the pinion to complete its full revolution.

If the new record selected is to the left of the record returned, referring to Fig. 6, the magazine is moved completely to the right and the magnet tip 150 engages the armature 144 on the return travel to the left. The rear face of said tip is so shaped that it pushes the armature out of its path and, therefore, does not stop the magazine. When the tip 150 has passed the armature, the magnetic attraction of magnet 147 again draws the armature outwardly to its former position in the path of travel. Upon completing the left-hand movement, the magazine again moves to the right until the tip 150 again encounters the armature and is mechanically stopped thereby.

During the removal, the playing and the return of the record, the armature is held in engagement with the magnet by magnetic attraction. When the record has been returned to its place in the magazine, the lever 84 strikes a notch 159 in the cam track 100 which permits the rod 89 to drop to its lowermost position. Since at this time the pin 95 is operating in a substantially vertical portion 160 of the guideway 94, no further movement of the finger 97 results but the pin 99 is permitted to strike the extension 158 of the yoke 157 and to press the same downwardly against the lever 152. The lever 152 is rocked about its pivotal mounting and the upper end thereof strikes the armature 144 and returns it to normal position. The lever 84 immediately leaves the notch 159, releasing the yoke 157 and permitting the lever 152 to return to its normal position under the influence of a spring 161. The magazine is then free to move for the selection of the next record to be played.

It is obvious that more than one record may be pre-selected at a given time. If two or more of the solenoids are actuated, the corresponding records will be played in sequence without further attention from the operator. In fact, all of the solenoids may be actuated simultaneously, whereupon all of the records will be successively removed and played.

Electrical control switches

For energizing the magnet 41 to start the record changing operations there is provided a pair of leaf contactors 162 mounted on a base 163 secured to the deck plate 20 and suitably insulated from each other. An arm 164 is freely mounted upon the sleeve 36 and has engaging the upper surface thereof a friction washer 165 preferably formed of cork. A collar 166 is secured to the sleeve 36 above the washer 165 and is properly positioned to press the washer against the arm 164 with sufficient pressure to cause the arm normally to move with the movement of the sleeve. However, said pressure is not sufficient to prevent the arm 164 from being mechanically moved relative to said sleeve. The arm 164 has a finger 167 movable through a slot 168 in the deck plate 20 and adapted to strike one of the contact members 162 to make contact between said members. The arm 164 also has a finger 169 extending beneath the deck plate 20 to a position opposite a pin 170 carried upon the undersurface of the hub 171 of the turntable.

By means of this arrangement, as the stylus moves inwardly over the surface of the record, the arm 164 is frictionally moved to approach the contact members 162. However, as long as the stylus is travelling in the reproducing groove, the inward movement is very slight for each rotation of the turntable. As the finger 167 approaches the position of the contact members 162, the finger 169 reaches the path of travel of the pin 170. At each revolution of the turntable, therefore, the pin 170 strikes the finger 169 and moves the arm 164 backwardly against the friction of the washer 165 a sufficient distance to prevent engagement with the contact members 162. When the stylus reaches the terminal groove 172 of the record, the arm 164 is quickly moved inward a much larger distance than on any previous revolution. The finger 167, therefore, strikes the contactor 162 before the finger 169 can be struck by the pin 170 and a momentary contact is made between said contact members 162. This contact will be made whether the record is provided with the spiral terminal groove shown in Fig. 1 or the oscillating eccentric terminal groove used with other types of records, since each moves the stylus rapidly inward during one revolution of the turntable. The momentary contact of the members 162 energizes the solenoid 41 by a circuit to be hereinafter described and thus initiates the record changing operations.

During the record changing operation the arm 164 is frictionally moved counterclockwise against the bracket 55 or other suitable stop by the movement of bushing 36 as the pickup arm is swung clear of the record. During the last portion of this pickup movement a leaf spring 171a secured to the collar 166 strikes the arm 164 and holds the same against the bracket 55 during the subsequent inward movement of the pickup arm to the starting point of the new record. This effectively prevents a rapid clockwise movement of the arm 164 during this part of the pickup movement and thus prevents premature actuation of the contactors 162.

For energizing the solenoid 42 to stop the record changing movements, there are provided a pair of leaf contactors 173 shown in Figs. 3 and 7 but omitted from Figs. 2 and 6 for the sake of showing other parts more clearly. Said contactors are mounted on a block 174 in turn mounted on a bracket 175 secured to the bracket 55 and are suitably insulated from each other. Freely mounted upon the stud 62 (Fig. 7) there is a V-shaped member 176 having one arm provided with a notch 177 engaging the pin 77 and having a second arm 178 extending above the contact members 173 when the stylus is in position above the starting point of the record. In Fig. 7 said arm is shown in the position it assumes at the completion of playing of a record. When the stylus has been returned to starting position, the arm has been moved counterclockwise to bring the same over the contact members 173. When the stylus is lowered to engage the record, the arm 178 is simultaneously lowered to engage the uppermost of the contact members 173 and press the same against the lowermost of said members. A circuit is completed thereby for energizing the solenoid 42 to stop the record changing mechanism.

After the solenoids 41 and 42 have been energized it is desirable that their circuits be immediately broken. In the case of solenoid 41 this prevents chattering of the solenoid due to repeated actuation thereof when the eccentric type of terminal groove is used on the record, since with this type of groove the finger 167 strikes the contact members 162 each time the record revolves until the record changing mechanism has progressed sufficiently to remove the stylus from the record. In the case of solenoid 42, the immediate breaking of the circuit prevents overheating of the solenoid. The breaking of these circuits is accomplished by means of a snap switch 179 mounted upon a bracket 180 beneath the clutch lever 39, (shown in Fig. 14 but omitted from Fig. 2 for sake of clearness). Said switch has a trigger 181 extending into the path of travel of the pin 49 which is extended beneath the lever 39 for this purpose. As the lever 39 is moved in one direction, the switch 179 is snapped to one position and as the lever is moved in the opposite direction the switch is snapped to the opposite position. The switch 179 includes two pairs of contact members 182 and 183 which are shown in a purely diagrammatic manner in Fig. 13. As the lever 39 is moved to the right, contactors 183 are closed and contactors 182 are opened. As the lever 39 is moved to the left, contactors 182 are closed and the contactors 183 are opened.

For relay control of the motor, there is provided a control box 184 (Fig. 13) which may be located at any convenient point on the machine and which includes a pair of contact members 185 and a pair of solenoids 186 and 187. As shown diagrammatically in Fig. 13, the contact members 185 are closed when solenoid 186 is energized and are opened when solenoid 187 is energized. For energizing the solenoid 186 there is provided a switch 188 which may be placed at any desired position. For energizing the solenoid 187, there is provided a switch 189 which is carried upon a bracket 190 supported upon the bracket 55 and which has a trigger 191 extending into the path of travel of a pin 192 carried upon the master cam 56 (shown in Fig. 7 and omitted from the figures). The trigger is provided with a spring 193 which returns the same to initial position after engagement of the pin 192. The passage of the pin, therefore, makes only a momentary contact for energizing the solenoid 183. The switch 189 is preferably of the standard snap switch design but is shown in a purely diagrammatic manner in Fig. 13. The pin 192 may be placed upon the master cam 56 in position to strike the switch 189 at any desired point in the cycle of operation, but preferably operates after the stylus has been lifted but before the actual movement of the record is begun.

*Wiring diagram and summary of electrical operation*

Referring now to Fig. 13, the electrical elements previously described are shown diagrammatically. In addition there are shown a transformer 198 and a plurality of push button switches 201, each of which is connected to one of the selector solenoids 142. Power mains 194 and 195 may be connected to any suitable source of alternating current, preferably the usual 110 volts and 60 cycles commercial supply, by a plug 196. The power main 194 is directly connected to one terminal of the motor 21 and to one of the primary terminals of the transformer 198. The second power main 195 is connected to one of the contact members 185 and to the second terminal of the primary winding of the transformer 198. The second of the contact members 185 is connected by a conductor 199 to the second terminal of the motor 21. Thus, when the contact members 185 are in contact the motor 21 is directly connected across the power mains and the machine is in operation. When the 185 contact is broken the motor stops and the machine ceases to operate. The transformer 198 however is connected across the power mains independently of the 185 contact and therefore is energized as long as the plug 196 is in place.

The transformer 198 has one terminal of its secondary winding connected to a distributory conductor 200, branches of which lead to one of the 162 contactors, to the 189 switch, to one of the 182 contactors, to the 185 switch and to each of the push buttons 201. The second terminal of the secondary winding of the transformer has connected thereto a distributory conductor 202, branches of which lead to each of the solenoids 186, 187, 182, 42 and 41. Other conductors shown in the diagram will be referred to by number only in tracing out the individual control circuits.

When it is desired to operate the machine, the plug 196 is connected to the power source to energize the transformer and the control switch 188 is closed, completing the following secondary circuit,—198, 200, 188, 207, 186, 202, 198. The solenoid 186 is energized thereby, closing the 185 contact and starting the motor. Before or after the closing of switch 188 as many of the push buttons 201 as desired are pressed to energize the corresponding solenoids 142 to select the records to be played. This circuit for each solenoid is as follows,—198, 200, 201, 209, 142, 202, 198. If, as is usual, the previous operation of the phonograph has been stopped with a record changing operation incomplete, the cycle of operation is started at the point at which it was previously discontinued since the clutch gears 38 and 37 will still be locked in mesh. As soon as a new record is placed on the turntable and the stylus is lowered to commence playing, the arm 178 strikes the contact member 173, completing the following circuit,—198, 200, 182, 205, 173, 42, 202, 198. This circuit is complete since the clutch lever 39 will be in the operating position in which the 182 contact is closed. Said circuit energizes solenoid 42 to withdraw the gear 38 from the pinion 37 and stop the record changing apparatus. At the same time, lever 39 breaks the 182 contact and makes the 183 contact, thus deenergizing solenoid 42.

When the playing of a record is complete, the 162 contact is momentarily closed, completing the following circuit,—198, 200, 162, 203, 183, 41, 202, 198. This circuit energizes solenoid 41 to place the gear 38 in engagement with the pinion 37 and start the record changing operation. At the same time, the lever 39 makes the 182 contact and breaks the 183 contact, thus deenergizing solenoid 41.

Successive record changing cycles take place automatically as long as the control switch 188 is closed since the solenoid 187 is not strong enough to pull the switch 185 to open position against the continued pull of the solenoid 186. During the successive cycles of operation all of the selected records will be played in sequence and if the playing is continued thereafter, the last selected record will be repeated indefinitely until the machine is stopped or another selection made.

When it is desired to stop the machine the switch 188 is opened, deenergizing solenoid 186. This does not immediately stop the operation since the 185 switch remains in closed position until solenoid 187 is energized by switch 189 when struck by the pin 192 at the proper time in the record changing cycle.

While the foregoing specification describes a continuous operation of the phonograph under control of the switch 188 it is obvious that any well known form of coin control may be substituted. For this purpose the multiple coin control shown in my co-pending application Serial No. 13,387 filed March 28, 1935, is preferred.

Other modifications may obviously be made by those skilled in the art without departing from the scope of the invention as defined by the appended claims.

The invention claimed is:

1. In a record changing phonograph, the combination of a playing turntable, a record storage magazine adapted to contain a plurality of records on edge, a record carrier movable between a vertical and a horizontal position, a movable finger adapted to roll a record from the magazine to the carrier when the latter is in the vertical position and serving to prevent the record from rolling from the carrier while in that position, and a stationary guide member mounted on the phonograph adjacent the line of movement of said carrier for preventing the record from rolling from the carrier during its movement from the vertical to the horizontal position to deposit the record on the turntable.

2. In a record changing phonograph, the combination of a playing turntable, a record storage magazine adapted to contain a plurality of records on edge, a record carrier movable between a vertical and a horizontal position, means for moving a record from the magazine to the carrier when the latter is in the vertical position, yielding means mounted upon said carrier for engaging a surface of the record to guide the same into position on the carrier and to retain the same thereon during movement of the carrier to the horizontal position to place the record on the turntable, and means on said turntable for disengaging said yielding means from the record when the latter has reached the turntable.

3. In a record changing phonograph, the combination of a playing turntable having a centering pin, a record storage magazine, a record carrier adapted to place a record from the magazine upon the turntable, and a yielding member mounted upon said carrier for engaging a surface of a record while on the carrier to retain the same thereon, said yielding member engaging the centering pin when the record has reached the turntable and being disengaged thereby from the record.

4. In a record changing phonograph, the combination of a movable structure having incorporated therein a record storage magazine, a series of stop members movable into and out of the path of movement of a projecting part of said structure, said part being shaped to move said stop members out of its path when moving in one direction but to be mechanically stopped thereby when moving in the other direction, and magnetic means for again drawing said stop members into said path when said projecting part has passed the same moving in said first mentioned direction.

5. In a record changing phonograph, the combination of a movable structure having incorporated therein a record storage magazine, a magnet carried by said structure, and a series of stop members normally positioned outside the range of attraction of said magnet but movable into the path of travel thereof, said magnet being shaped to mechanically stop the movement of said structure when it encounters one of said stop members while moving in one direction, but when moving in the opposite direction acting first to move the stop member out of said path to permit passage of the magnet and then return the same by magnetic attraction to its position in said path.

6. In a record changing phonograph, the combination of a playing turntable, a record storage magazine adapted to contain a plurality of records on edge, a record carrier movable between a vertical and a horizontal position, an inclined trackway leading from the magazine to the carrier, a movable finger adapted to roll a record from the magazine to the carrier when the latter is in the vertical position and serving to prevent the record from rolling from the carrier while in that position, means operable thereafter to move the carrier to place the record on the turntable for playing and to remove the same therefrom after playing, a stationary guide member mounted on the phonograph adjacent the line of movement of said carrier for preventing the record from rolling from the carrier during said movement, and means operating after said movement to retract the finger to permit the record to roll down the trackway to the magazine.

7. In a record changing phonograph, the combination of a playing turntable, a record storage magazine adapted to contain a plurality of records, a record carrier adapted to receive a record for transmitting it to the turntable and returning it to the magazine after reproduction, means for moving the magazine with respect to the carrier upon the return of the record thereto and before transmitting the next record therefrom, selective members adapted to be projected into the path of movement of the magazine to arrest it at a predetermined position for transmission of a selected record therefrom to the carrier, and means carried by said magazine and operable intermediate the movements of the magazine for retracting the operative member after it has once acted to position the magazine.

8. In a record changing phonograph, the combination of a playing turntable, a record storage magazine adapted to contain a plurality of records, said magazine being provided with compartments for receiving the respective records, a record carrier positioned in the plane of one of said compartments for receiving a record therefrom, transferring it to the turntable and returning it to the magazine, means for normally reciprocating said magazine back and forth to carry the records and compartments past the carrier, said means being adapted to move the magazine from one extreme position to the other through substantially a complete cycle, a series of selective members adapted to be moved in the path of travel of the magazine for engagement thereby to arrest and position the magazine with a selected record in the plane of the carrier for transfer thereto, and means carried by said magazine for retracting the arresting member after the magazine has been selectively positioned thereby.

RALPH R. ERBE.